July 2, 1957  O. H. QUANTRILLE  2,797,453
WEATHER STRIP STRUCTURE FOR DOORS
Filed Dec. 2, 1953
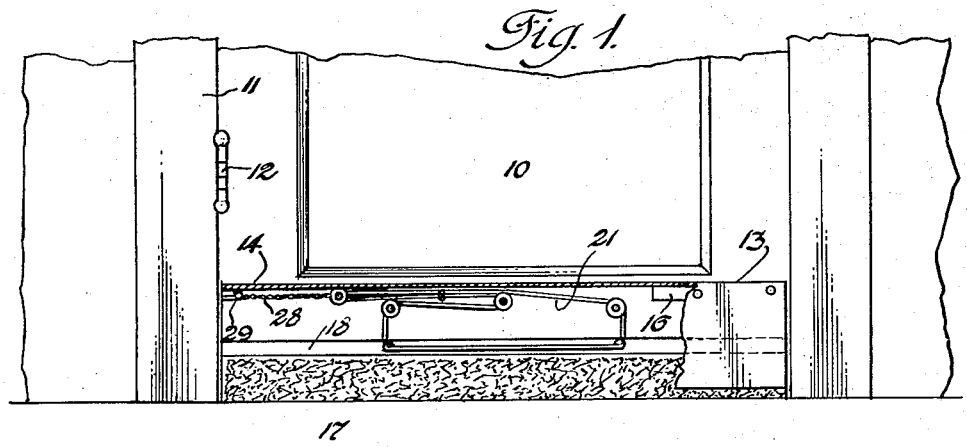
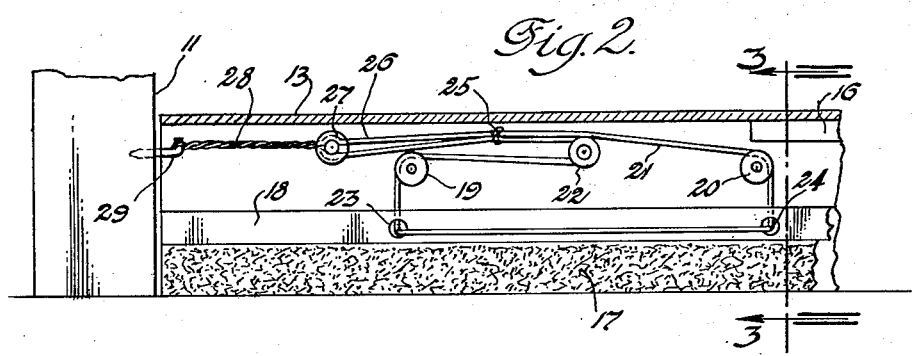
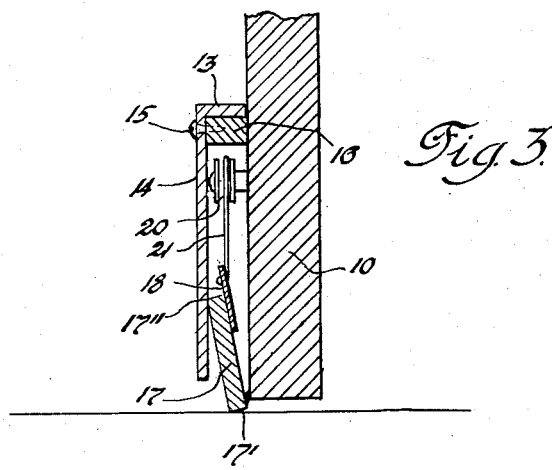
INVENTOR
Oliver H. Quantrille
By John P. Murphy

2,797,453
WEATHER STRIP STRUCTURE FOR DOORS

Oliver H. Quantrille, Syracuse, N. Y.

Application December 2, 1953, Serial No. 395,714

1 Claim. (Cl. 20—68)

This invention relates to a weather strip structure for doors.

It is an object of the present invention to provide a weather strip structure for doors which may be automatically elevated as the door is opened but which will be lowered to engage the floor as the door is closed.

It is another object of the invention to provide a weather strip structure for doors comprising a felt member and a guide casing for the felt member, the inner face of which will be engaged by the felt member and this felt member lying at an angle thereby to prevent leakage of air through the guide casing as well as under the door and wherein the felt member is so suspended within the guide in an off balance manner so that the weather strip is so pressed against the inner face of the guide casing as well as against the bottom of the door.

Other objects of the invention are to provide a weather strip structure for doors which is of simple construction, inexpensive to manufacture, easy to install upon the door, has a minimum number of parts, durable, of pleasing appearance and efficient in operation.

For a better understanding of the invention reference may be had to the following detailed description taken in connection with the accompanying drawing, in which:

Figure 1 is an elevational view of the weather strip structure and of the door to which it is applied with a portion of the casing of the structure broken away to show the interior construction thereof;

Fig. 2 is an enlarged fragmentary elevational view of the structure and similar to Fig. 1;

Fig. 3 is an enlarged transverse sectional view taken on line 3—3 of Fig. 2.

Referring now to the figures, 10 represents a door that is connected to a door opening 11 by a hinge 12 in the usual manner. On the lower part of the door there is affixed the weather strip structure 13 embodying the features of the present invention.

The weather strip structure 13 comprises a casing 14 secured by means of screws 15 to mounting blocks 16 on the face of the door. The casing 14 extends the full width of the door and serves as a guide for a weather strip member 17. This weather strip member has a metal strip 18 extending across the top of the same to provide adequate weight for the lowering of the weather strip and maintaining it in tight contact with the inner face of the casing 14 and with the bottom of the door and also with the floor so as to make an absolute sealing joint for the door 10 and opening 11 when the door is in the closed position.

On the face of the door are two pulleys 19 and 20 over which extend a rope 21 that is doubled on itself and extends over a central pulley 22. This rope extends through holes 23 and 24 in the metal strip 18. The holes 23 and 24 are sufficiently spaced so as to support the weather strip in a balanced manner and evenly within the casing 13.

The ends of the rope are joined together as indicated at 25 and a loop 26 is secured to a connector 27 of a chain 28 that can be adjustably secured to a hook 29 on the side of the door opening 11.

The chain 28 can be connected in an adjustable manner or with different links thereof upon the hook 29 so that the felt member 17 will be properly adjusted to engage the floor when the door is closed and so as to be pulled or elevated slowly as the door is opened. The hook is offset with respect to the door edge and accordingly as the door is opened and moves outwardly out of the opening, a pull will be made upon the rope 21 so that the felt member 17 is elevated.

The rope 21 is so connected to the sheet metal strip 18 and the member 17 is so connected to the strip 18 that the member 17 will lie in an off-balance position, as best seen in Fig. 3, so that not only will its lower edge, as indicated at 17' engage with the floor and the lower edge of the door, but its upper edge will engage with the inner face of the guide casing 14, as indicated at 17".

It should now be apparent that there has been provided an efficient and effective door structure including a weather strip member which not only is held in a tight manner against the floor but also against the interior of the guide casing in order to prevent any leakage over the upper edge of the weather strip or member 17 and into the casing 14.

While various changes may be made in the detail construction, it shall be understood that such changes shall be within the spirit and scope of the present invention as defined by the appended claim.

What is claimed is:

A weather strip structure comprising a casing adapted to extend the full width of a door and adapted to be secured to the face of the door, pulley members adapted to be engaged with the door, a rope extending over the pulley members, a sealing member of sealing material extending the full width of the casing and slidable therein, a metal member fixed to the sealing member along the upper portion thereof, said rope extending through the metal strip member at two locations to support the sealing member in a horizontal position relative to the floor, said metal member tending to throw the sealing member off balance so that the sealing member will engage at its upper edge the inner face of the casing and at its lower edge the lower edge of the door, said rope being doubled on itself and a chain connected to the doubled end thereof, a hook adapted to engage with the side of the door opening, and a chain having links extending between the double ends of the rope and engageable by either of its links and in an adjustable manner with the hook.

References Cited in the file of this patent

UNITED STATES PATENTS

| 1,548,769 | Thompson | Aug. 4, 1925 |

FOREIGN PATENTS

| 4,413 | Great Britain | Feb. 28, 1893 |
| 154,292 | Great Britain | Nov. 19, 1920 |
| 664,133 | France | Apr. 16, 1929 |
| 98,831 | Sweden | May 7, 1940 |